E. A. SUVERKROP AND E. VIALL.
METHOD OF AND MEANS FOR RIFLING GUNS.
APPLICATION FILED AUG. 16, 1918.
1,310,934. Patented July 22, 1919.
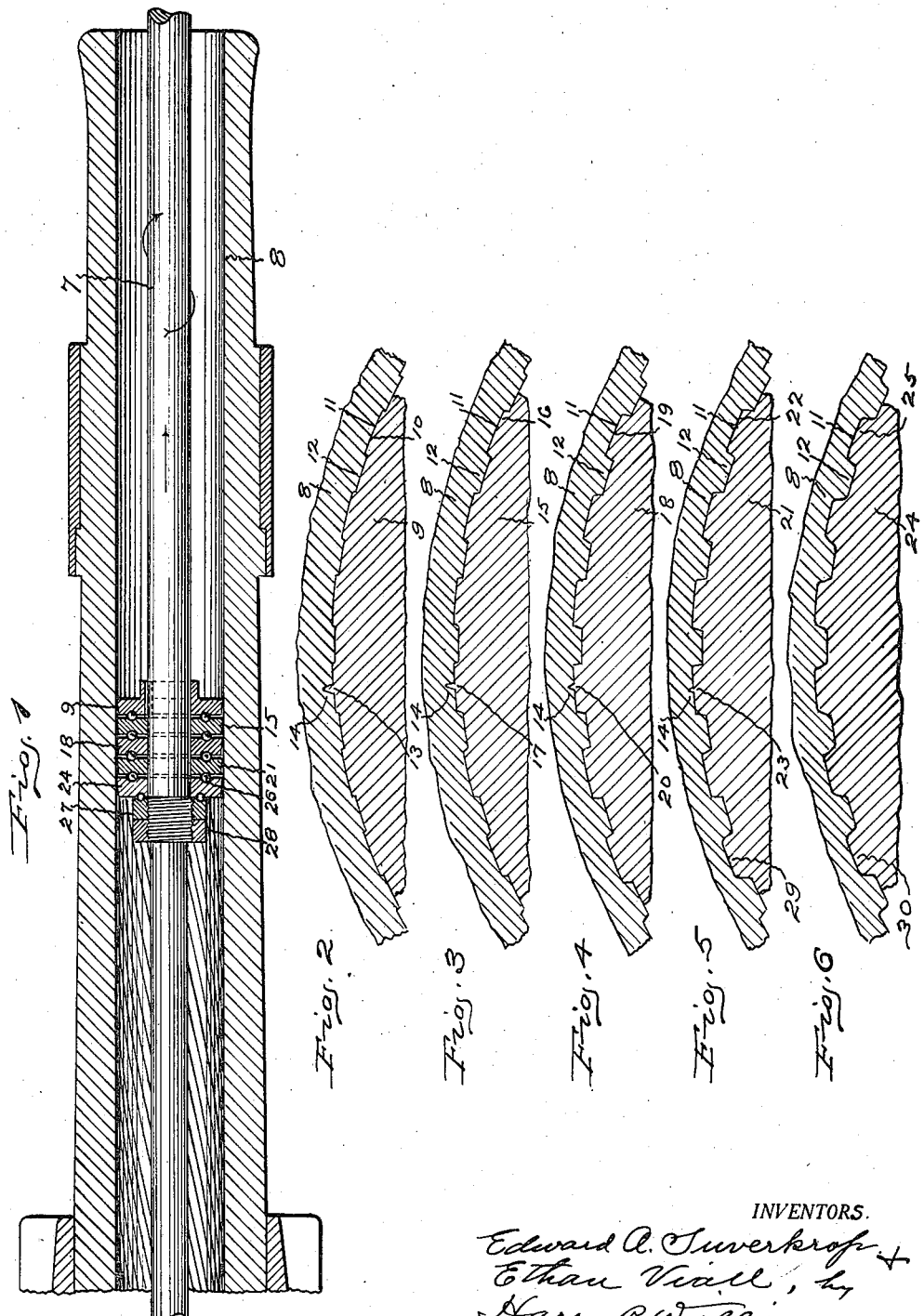
INVENTORS.
Edward A. Suverkrop
Ethan Viall, by
Harry R. Williams
ATTORNEY.

UNITED STATES PATENT OFFICE.

EDWARD A. SUVERKROP, OF SEA CLIFF, NEW YORK, AND ETHAN VIALL, OF EAST ORANGE, NEW JERSEY.

METHOD OF AND MEANS FOR RIFLING GUNS.

1,310,934.  Specification of Letters Patent.  Patented July 22, 1919.

Application filed August 16, 1918. Serial No. 250,171.

*To all whom it may concern:*

Be it known that we, EDWARD A. SUVERKROP, a citizen of the United States, residing at Sea Cliff, Long Island, New York, and ETHAN VIALL, a citizen of the United States, residing at East Orange, New Jersey, have invented a new and useful Improvement in Methods of and Means for Rifling Guns, of which the following is a specification.

This invention relates to a method of and means for cutting the rifling grooves in the tubes of heavy ordnance, such as field pieces, anti-air craft, coast defense and naval guns, in which the rifling has a progressive twist.

The object of the invention is to provide a simple method and relatively inexpensive means whereby the grooves may be cut forwardly or backwardly, as is considered most expedient, and the rifling lands formed rapidly and accurately with any predetermined increasing or decreasing twist which is called for.

In attaining this end according to this invention all or a majority of the rifling grooves are cut at the same time and completed or substantially finished by the passage of the broaching tool through the gun, which broaching tool is made up of a plural number of rotarily independent toothed cutting-disks so shaped and arranged that each succeeding cutter removes more metal than the preceding cutter and the first cutter, which is positively given the necessary rotatory movement to give the grooves the required twist, as it passes through the gun barrel, cuts one or more guiding grooves which the succeeding cutters accurately follow.

In the accompanying drawings Figure 1 shows a horizontal section of the muzzle end of a field gun with the rifling grooves being formed from the breech to the muzzle according to this invention. Fig. 2, on much larger scale, shows a small section of the first cutter and a piece of the gun tube, illustrating the manner in which the first cutter removes a small amount of metal from the grooves and forms a guiding groove for the succeeding cutters to follow. Fig. 3 shows a small section of the second cutter and a portion of the gun tube. Fig. 4 shows a small section of the third cutter and a portion of the gun tube. Fig. 5 shows a section of the fourth cutter and the gun tube. Fig. 6 shows a section of the fifth cutter and the gun tube, this cutter having its teeth so shaped as to finish the cuts and remove all trace of the guiding groove which was formed by the first cutter and followed by the intermediate cutters.

In practising this invention a shaft 7 is located in the bore of the gun barrel 8. This shaft may be pushed or pulled through the gun or the gun may be moved longitudinally to give a relatively longitudinal movement to the two, by any well known mechanism. As the relative longitudinal movement between the gun barrel and the shaft is affected the shaft is given a rotatory movement by any common means, which rotatory movement is so synchronized with the longitudinal movement that the first broaching cutter 9, which is keyed to the shaft, is given such a rotary movement that it will cut grooves having the desired twist. The broaching cutters are disks of steel with cutting teeth of the required size about their peripheries. The first cutter 9, besides having teeth 10 which start the cutting of the rifling grooves 11 and leave the lands 12, has one or more pilot teeth 13 which cut guiding grooves 14 a little deeper than the grooves cut by the teeth 10. These guiding grooves may be any satisfactory shape, but are desirably V-shaped, as shown. The second cutter 15 is mounted on the shaft so that it may have a free rotatory movement. This cutter has teeth 16 which cut the rifling grooves a little deeper than the teeth of the first cutter, and it also has a pilot tooth 17 which follows the pilot groove 14 made by the pilot tooth 13 of the first cutter. The third cutter 18, which is also free to rotate on the shaft, has teeth 19 which cut the rifling grooves deeper, and it also has a pilot tooth 20 which follows the pilot groove. The fourth cutter 21 has teeth 22 which cut the rifling grooves still deeper and a pilot tooth 23 which follows the pilot groove already formed. This cutter also has one or more teeth 29 which will finish one or more of the rifling grooves so as to provide a guide for the last cutter. The fifth cutter 24 has teeth 25 which cut the grooves to the full depth and shape the lands to the desired outline, eliminating all trace of the pilot grooves already formed. This cutter has one or more pilot teeth 30 which do not cut but which will follow the pilot grooves already cut to complete depth by the preceding cutter. There may be as many of these toothed broaching cutters arranged one after the other as is necessary to form the grooves to the desired depth, and these cutters are desirably separated by rings of anti-friction balls 26. The shaft back of the last cutter is shown as threaded and on the threaded portion are nuts 27 and 28 for holding the cutters in place when the shaft and the gun are moved longitudinally with relation to each other.

With the construction described the first cutter starts the grooves and as that cutter is fixed upon the shaft it of necessity gives the grooves the predetermined twist and forms the pilot groove or grooves which the succeeding cutters follow. This arrangement is particularly serviceable in cutting the rifling grooves in barrels where the twist increases from breech to muzzle and the twist is imparted by rotating the shaft outside of the gun. As the cutters which succeed the first are loose on the shaft they of necessity follow the pilot groove first formed and thus they continue the cutting of the grooves accurately.

The invention claimed is;

1. The method of rifling guns which consists in causing a relative longitudinal-rotatory movement between a gun and a cutter and forming a pilot groove having the desired twist in the interior of the bore and completing the cutting of the rifling groove by succeeding cutters which are caused to follow the pilot groove.

2. The method of rifling guns which consists in causing a relative longitudinal-rotatory movement between a gun and a cutter and simultaneously forming some of the rifling grooves and a pilot groove having the desired twist in the interior of the bore and completing the cutting of the rifling grooves by succeeding cutters which are caused to follow the pilot groove.

3. The method of rifling guns which consists in forming a pilot groove having the required twist in the interior of the bore and causing the rifling cutters to follow said pilot groove and finally illuminate the same.

4. The method of rifling guns which consists in forming a pilot groove having the required twist in the interior of the bore and simultaneously cutting the grooves the required depth by cutters caused to follow the pilot groove.

5. The method of rifling guns which consists in cutting a pilot groove in the bore of the gun and cutting other grooves to the required depth by successive cutters which are guided by the pilot groove.

6. A broach for cutting the rifling grooves in the bore of a gun comprising a number of disks provided with cutting teeth, the first of said cutting disks having a pilot tooth for cutting a pilot groove and the succeeding disks having teeth for causing them to follow the pilot groove and finally eliminate said groove.

7. An apparatus for cutting the rifling grooves in the bores of guns, consisting of a shaft, a disk with cutting teeth fixed upon the shaft, and disks with cutting teeth rotatably mounted on the shaft.

8. An apparatus for cutting the rifling grooves in the bores of guns, consisting of a rotatory shaft, a disk with groove-cutting teeth and a pilot tooth fixed upon the shaft, and disks with cutting teeth rotatably mounted on the shaft back of the fixed disk.

9. An apparatus for cutting the rifling grooves in the bores of guns, consisting of a rotatory shaft, a disk with groove-cutting teeth and a pilot tooth fixed upon the shaft, and disks with cutting teeth and pilot teeth rotatably mounted on the shaft back of the fixed disk.

10. The combination in an apparatus for cutting the rifling grooves in the bores of guns, of a rotatory shaft, a disk with cutting teeth fixed upon the shaft, disks with cutting teeth rotatably mounted upon the shaft back of the fixed disk, and anti-friction devices arranged between the disks.

EDWARD A. SUVERKROP.
ETHAN VIALL.